(12) United States Patent
Bastiao

(10) Patent No.: US 9,353,828 B1
(45) Date of Patent: May 31, 2016

(54) DEVICE AND METHOD FOR JOINING CORDS OR ROPES

(71) Applicant: Rui M. Bastiao, Honolulu, HI (US)

(72) Inventor: Rui M. Bastiao, Honolulu, HI (US)

( * ) Notice: Subject to any disclaimer, the term of this patent is extended or adjusted under 35 U.S.C. 154(b) by 0 days.

(21) Appl. No.: 14/673,841

(22) Filed: Mar. 30, 2015

Related U.S. Application Data

(60) Provisional application No. 62/098,218, filed on Dec. 30, 2014.

(51) Int. Cl.
*F16G 11/00* (2006.01)
*F16G 11/10* (2006.01)
*F16G 11/04* (2006.01)

(52) U.S. Cl.
CPC ............... *F16G 11/00* (2013.01); *F16G 11/04* (2013.01); *F16G 11/10* (2013.01); *F16G 11/103* (2013.01); *Y10T 24/3918* (2015.01)

(58) Field of Classification Search
CPC ....... F16G 11/00; F16G 11/103; F16G 11/10; F16G 11/04; Y10T 24/3916; Y10T 24/3918; Y10T 24/29
See application file for complete search history.

(56) References Cited

U.S. PATENT DOCUMENTS

| | | | | |
|---|---|---|---|---|
| 903,240 A | * | 11/1908 | Smith | F16G 11/00 24/129 R |
| 6,381,816 B1 | * | 5/2002 | Lai | A43C 7/00 24/130 |

* cited by examiner

*Primary Examiner* — Robert J Sandy
*Assistant Examiner* — Michael Lee
(74) *Attorney, Agent, or Firm* — Nancy J. Flint, Esq.; Nancy J. Flint, Attorney at Law, P.A.

(57) ABSTRACT

A device for joining two or more cords or ropes together, or for tightening or connecting a single rope or cord to itself or to a surface, without the need to tie or untie a knot is disclosed. The device can also be used to adjust the lengths of cords or ropes. The device can be used with cords and ropes of any sizes or lengths.

9 Claims, 2 Drawing Sheets

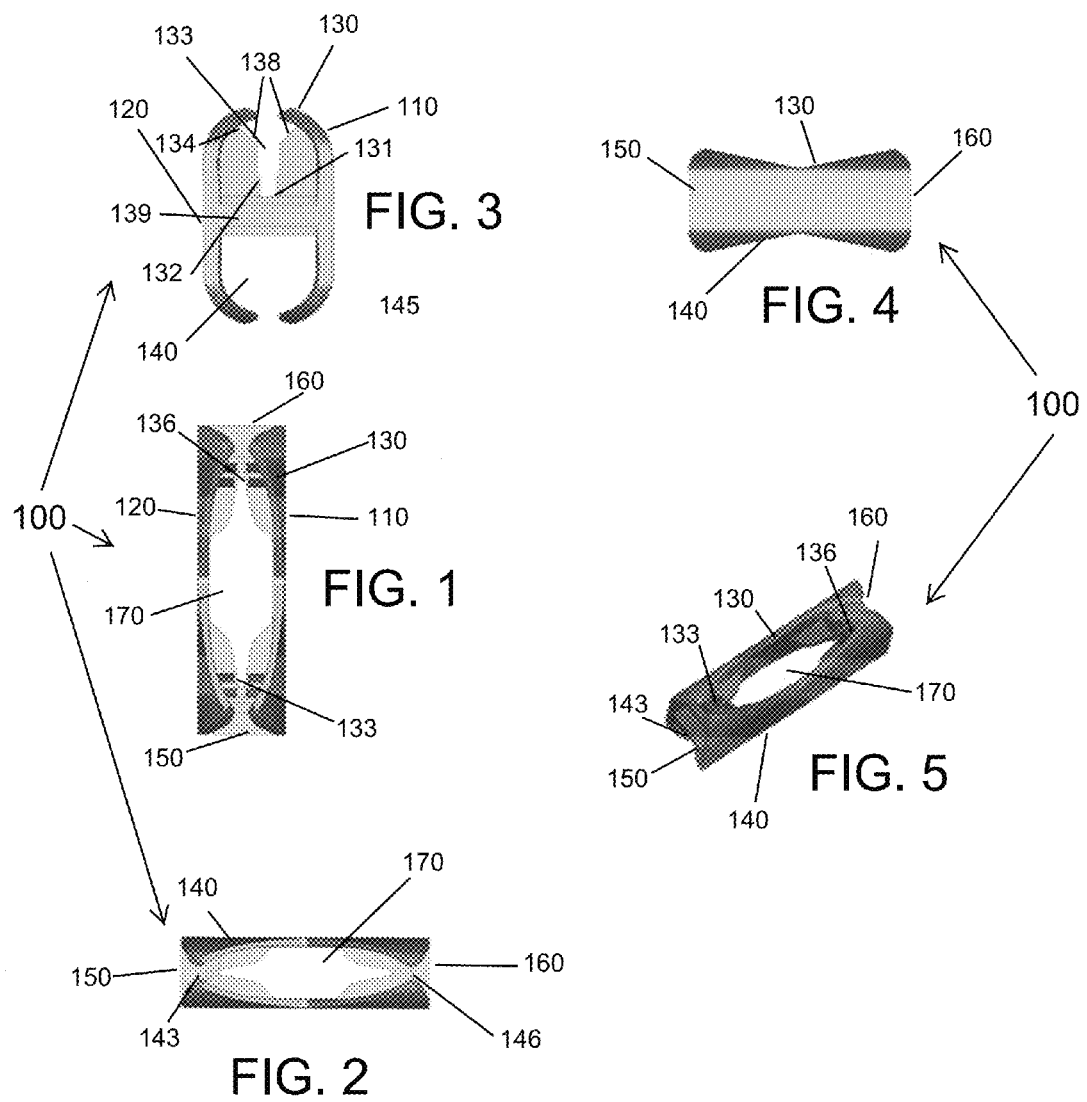

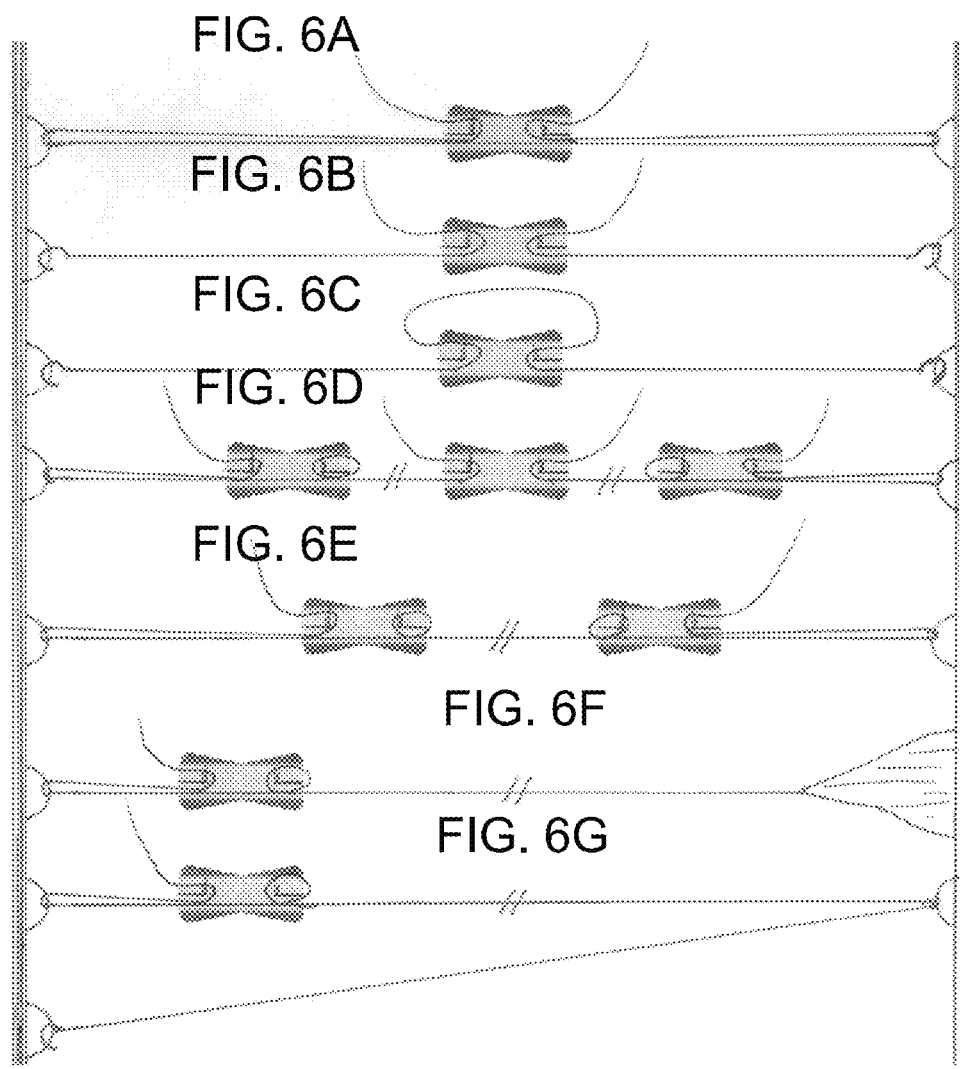

DEVICE AND METHOD FOR JOINING CORDS OR ROPES

FIELD OF THE INVENTION

The invention relates to a device for joining two or more cords or ropes together, or for tightening or connecting a single rope or cord to itself or to a surface, without the need to tie or untie a knot. The device can also be used to adjust the lengths of cords or ropes. The device can be used with cords and ropes of any sizes or lengths.

BACKGROUND OF THE INVENTION

A knot is a method of fastening or securing linear material such as rope by tying or interweaving. It may consist of a length of one or several segments of rope, string, webbing, twine, strap, or even chain interwoven such that the line can bind to itself or to some other object.

Knots have been used for different purposes over the years for such things as fastening and tying objects together and even for recording information. Different varieties of knots have been widely used since early cultures to form snares, nets and traps for capturing food. The construction of shelters and weapons, the making of clothing, the capability to move and pull heavy loads, all required the use of sturdy knots.

Historically, methods of tying certain knots are learned at a young age and passed down from generation to generation, for example learning to tie one's shoe laces, or form a knot in a neck tie. Knots were often called different names in different regions, and depending on how and what they were used for. There are thousands of types of knots that can be used for different purposes. Even in today's world of digital technology, knots remain indispensable. On the deck of NASA's Mars rover Curiosity, cables are bundled and tied down with a variation on the reef knot, used by mariners thousands of years ago to trim their sails, and the clove hitch, a knot that entered the historical record in the first writings of the Greek physician Heraklas.

Knots weaken the rope in which they are made and the knotted rope can fail when it is strained to its breaking point, which is usually at the knot or close to it. While splicing ropes together can maintain nearly the full rope's strength, in most situations forming loops and bends with conventional knots is far more practical than using rope splices. Even if a knotted rope does not break under strain, a knot may still fail to hold due to slipping; capsizing; and sliding. Additionally, knots differ in the effort required to untie them.

People often have a difficult time tying one or more knots. Several devices have been developed to help connect ropes or cords without having to tie a knot.

U.S. Pat. No. 2,758,858 to Smith, Jr. discloses a knot tying tool which includes a first end for tying slipknots and incorporates a groove for holding a hook during the tying process and a groove through which the free end of the leader or the like may be fed to complete the knot and a second end including one or more portions having differing radii for tying fixed-loop or slip-type fastening elements.

U.S. Pat. No. 3,131,957 to Musto discloses a multi-part cylindrical element through which the leader is fed to assist in the tying of leaders and lines.

U.S. Pat. No. 3,177,021 to Benham discloses a two-part knot tying device wherein the first part is secured over the user's finger and the second part, which is a cylindrical split element, utilizes its forward end to secure the hook during the tying operation.

U.S. Pat. No. 3,630,555 to Newlin discloses a knot tying device having a relatively flat, thin element including a slot having a cutting edge for cutting the leader and a cylindrical portion having bores therethrough for assisting in the knot tying.

U.S. Pat. No. 3,712,651 to Shockley discloses a knot tying device including spring-loaded clamping means for securing a fish hook in place during the knot tying process, and further including a cylindrical tube and a telescopically received rod for pulling the free end of the line through the loops.

U.S. Pat. No. 3,873,140 to Bloch discloses a fish hook holder and knot tying device including means to pierce the end of the leader allowing a barbed eyelet to be inserted within the end and three adjacent tying fingers extending from one end of the knot tying device.

U.S. Pat. No. 5,098,137 to Wardall discloses a device for facilitating knots in the shape of an elongated rectangle having a hole through one end portion and a forked portion at the opposite end, and including very specific dimensions.

U.S. Pat. No. 7,419,195 to Jochum discloses a knot tying tool for tying knots in cords or lines of material including those for attaching the line to an eyelet of an object. The knot tying tool includes a base member having first and second ends, a first post extending from the first end of the base member, a second post extending from the second end of the base member, a loop retainer operatively associated with the second post for retaining a portion of one loop of a line forming part of a knot being tied, wherein the line includes a working end and a standing end, a support member operatively associated with the first post, wherein the support member includes a catch positioned spaced apart from the loop retainer for holding a portion of the retained loop of the line, and a rotatably-actuated clamp assembly for receiving and releasably retaining the standing end of the line.

U.S. Pat. No. 7,997,629 to High discloses a knot tying apparatus for tying a pair of fishing lines to one another is provided. The apparatus includes a tubular body having a through passage extending between opposite first and second ends with a slot extending from the first end toward the second end. Further, the apparatus has an actuator coupled to the tubular body for sliding movement between the first and second ends. The actuator is moveable between the first and second ends via application of an external force to removed loops of the one of the lines from the tubular body onto the other of the lines.

SUMMARY OF THE INVENTION

The invention comprises a device for connecting two or more cords or ropes together without the need to tie a knot. The device may be used to secure two cords or ropes; to tighten tension on connected or singular cords or ropes; and to shorten or lengthen connected or singular cords or ropes. Any types and sizes of cords or ropes may be connected, tightened or shortened using the device.

Cords or ropes that are connected using the device of the invention are easily disconnected. Any number of cords or ropes may be connected using multiple devices.

The device comprises a body having two lateral sides (a left side and a right side), a top, a bottom, a distal end and a proximal end. The body comprises a cavity defined between the left side, the right side, the distal end and the proximal end, wherein the cavity extends through the body from the top to the bottom. On the top, the device comprises two cord retainers at either end of the body, comprising a distal cord retainer and a proximal cord retainer. Each distal and proximal cord retainer comprises opposing interior edges extending upwardly toward the top and downwardly toward the bottom from substantially the mid-point between the top of the device and the bottom of the device, thus forming a lower interior edges end and a higher interior edges end. The interior edges experience various spacing distances apart beginning at the lower interior edges end where the spacing is the closest and increasing in the direction toward the top of the device, ending at the higher interior edges end where the spacing between the two interior edges is the greatest. At some points, the interior edges may maintain a substantially constant spacing apart for a distance, and then the spacing may be increased abruptly or gradually. At some points, the spacing between the interior edges may increase on a constant substantially linear path. At points where the spacing between the interior edges increases abruptly, a shoulder or flange may be formed at the point of change in spacing. On the bottom, the device comprises two cord channels at either end of the body, comprising a distal cord channel and a proximal cord channel. The left side and right side may be formed in the profile of a "V" shape, creating a valley in substantially the mid-point of each of the left side and right side between the distal end and the proximal end of the body.

The device may be used for numerous purposes. For example, the device may be used to:
  Adjust/tighten/tension a bungee cord;
  Splice/connect two bungee cords;
  Splice/connect 2 cords or ropes; and
  Adjust/tighten/tension a single cord or rope.

In operation, using the example of splicing or connecting 2 cords or ropes, a first end of the first cord or rope is threaded through the cavity from the bottom of the device to the top of the device. The first end of the first cord or rope is then threaded through the distal cord retainer and directed toward the lower interior edges end until it is held secure between the interior edges of the distal cord retainer at the point in the first cord or rope where the desired tension or length is achieved. The other end of the first cord or rope is inserted through the distal cord channel on the bottom of the device. Next, the first end of the second core or rope is threaded through the cavity from the bottom of the device to the top of the device. The first end of the second cord or rope is then threaded through the proximal cord retainer and directed toward the lower interior edges end of the proximal cord retainer until it is held secure between the interior edges of the proximal cord retainer at the point the second cord or rope where the desired tension or length is achieved. The other end of the second cord or rope is inserted through the proximal cord channel on the bottom of the device. Each first end of the first and second cord or rope may be secured to itself.

BRIEF DESCRIPTION OF THE DRAWINGS

FIG. 1 is an end view of the device.
FIG. 2 is a top view of the device.
FIG. 3 is a bottom view of the device.
FIG. 4 is a side view of the device.
FIG. 5 is a top perspective view of the device.
FIGS. 6A-6G are depictions of various uses of the device.

DETAILED DESCRIPTION OF THE INVENTION

The invention comprises a device for connecting two or more cords or ropes together without the need to tie a knot. The device may be used to secure two cords or ropes; to tighten tension on singular or connected cords or ropes; and to shorten or lengthen singular or connected cords or ropes. Any types and sizes of cords or ropes may be connected using the device.

Cords or ropes that are connected using the device of the invention are easily disconnected. Any number of cords or ropes may be connected using multiple devices.

The device comprises a body having two lateral sides (a left side and a right side), a top, a bottom, a distal end and a proximal end. The body comprises a cavity defined between the left side, the right side, the distal end and the proximal end, wherein the cavity extends through the body from the top to the bottom. On the top, the device comprises two cord retainers at either end of the body, comprising a distal cord retainer and a proximal cord retainer. Each distal and proximal cord retainer comprises opposing interior edges extending upwardly toward the top and downwardly toward the bottom from substantially the mid-point between the top of the device and the bottom of the device, thus forming a lower interior edges end and a higher interior edges end. The interior edges experience various spacing distances apart beginning at the lower interior edges end where the spacing is the closest and increasing in the direction toward the top of the device, ending at the higher interior edges end where the spacing between the two interior edges is the greatest. At some points, the interior edges may maintain a constant spacing apart for a distance, and then the spacing may be increased abruptly or gradually. At some points, the spacing between the interior edges may increase on a constant substantially linear path. At points where the spacing between the interior edges increases abruptly, a shoulder or flange may be formed at the point of change in spacing. On the bottom of the device, the cavity is formed to create two cord channels at either end of the body, comprising a distal cord channel and a proximal cord channel. The left side and right side may be formed in the profile of a "V" shape, creating a valley in substantially the mid-point of each of the left side and right side between the distal end and the proximal end of the body.

The device may be used for numerous purposes. For example, the device may be used for example to:
  Adjust/tighten/tension a bungee cord;
  Splice/connect two bungee cords;
  Splice/connect 2 cords or ropes; and
  Adjust/tighten/tension a single cord or rope.
  Adjust/Tighten/Tension a Bungee Cord To adjust/tighten/create tension in a single bungee cord using the device, a portion of the bungee cord is threaded through the cavity from the bottom of the device to the top of the device thus forming a loop on the top of the device. A first portion of the bungee cord forming the loop is threaded through the distal cord retainer and directed toward the lower interior edges end until it is held secure between the interior edges of the distal cord retainer. Next, a second portion of the bungee cord forming the loop is threaded through the proximal cord retainer and directed toward the lower interior edges end until it is held secure between the interior edges of the proximal cord retainer at the point where the desired tension or length of the bungee cord is achieved. Each end of the bungee cord on the bottom of the device is threaded through the two channels.

Splice/Connect Two Bungee Cords

To splice/connect two bungee cords, a first end of the first bungee cord is threaded through the cavity from the bottom of the device to the top of the device. The first end of the first bungee cord is then threaded through the distal cord retainer and directed toward the lower interior edges end until it is held secure between the interior edges of the distal cord retainer at the point where the desired tension or length of the first bungee cord is achieved. The other end of the first bungee cord is inserted through the distal cord channel on the bottom of the device. Next, the first end of the second bungee cord is threaded through the cavity from the bottom of the device to the top of the device. The first end of the second bungee cord is then threaded through the proximal cord retainer and directed toward the lower interior edges end of the proximal cord retainer until it is held secure between the interior edges of the proximal cord retainer at the point where the desired tension or length of the second bungee cord is achieved. The other end of the second bungee cord is inserted through the proximal cord channel on the bottom of the device. Each first end may be secured to its own bungee cord.

Splice/Connect 2 Cords or Ropes

To splice or connect 2 cords or ropes, a first end of the first cord or rope is threaded through the cavity from the bottom of the device to the top of the device. The first end of the first cord or rope is threaded through the distal cord retainer and directed toward the lower interior edges end until it is held secure between the interior edges of the distal cord retainer at the point where the desired tension or length of the first cord or rope is achieved. The other end of the first cord or rope is inserted through the distal cord channel on the bottom of the device. Next, the first end of the second core or rope is threaded through the cavity from the bottom of the device to the top of the device. The first end of the second cord or rope is then threaded through the proximal cord retainer and directed toward the lower interior edges end of the proximal cord retainer until it is held secure between the interior edges of the proximal cord retainer at the point where the desired tension or length of the second cord or rope is achieved. The other end of the second cord or rope is inserted through the proximal cord channel on the bottom of the device. Each first end may be secured to its own cord or rope.

Adjust/Tighten/Tension a Single Cord or Rope

To adjust/tighten/create tension in a single cord or rope, a portion of the cord or rope is threaded through the cavity from the bottom of the device to the top of the device thus forming a loop on the top of the device. A first portion of the cord or rope forming the loop is threaded through the distal cord retainer and directed toward the lower interior edges end until it is held secure between the interior edges of the distal cord retainer. Next, a second portion of the cord or rope forming the loop is threaded through the proximal cord retainer and directed toward the lower interior edges end of the proximal cord retainer until it is held secure between the interior edges of the proximal cord retainer at the point where the desired tension or length of the cord or rope is achieved. Each end of the cord or rope on the bottom of the device is threaded through the two channels.

The device may be made out of any material desired by the user. In one embodiment, the device is made of plastic, such as ABS or nylon, fiberglass, metal, or a combination thereof. The device may be made of a rigid material or a semi-rigid material. In one embodiment, the device is made out of ABS material. The device may be made in different dimensions to accommodate different sizes of cords or ropes. In one embodiment, the different ends of the device have similar sizes of cord retainers and channels. In one embodiment, the different ends of the device have different sizes of cord retainers and channels. In one embodiment, the body of the device is approximately 63 mm long; 18 mm wide between the left side and right side; and 40 mm thick.

Turning to the figures, FIG. 1 is a top view of the device 100 comprising a right lateral side 110 and a left lateral side 120; a top side 130; a distal end 150; and a proximal end 160. A cavity 170 is defined between the left lateral side 120, the right lateral side 110, the distal end 150 and the proximal end 160. Top side 130 of device 100 comprises a distal cord retainer 133 and a proximal cord retainer 136.

FIG. 2 is a bottom view of the device 100 comprising a right lateral side 110 and a left lateral side 120; a bottom side 140; a distal end 150; and a proximal end 160. Cavity 170 is defined between the left lateral side 120, the right lateral side 110, the distal end 150 and the proximal end 160. Bottom side 140 of device 100 comprises a distal channel 143 and a proximal channel 146.

FIG. 3 is a distal end view of the device 100 comprising a right lateral side 110 and a left lateral side 120; a top side 430; a bottom side 140; distal cord retainer 133 comprising opposing interior edges 138 extending upwardly toward the top and downwardly toward the bottom from substantially the midpoint 139 between the top side 130 of the device 100 and the bottom side 140 of the device 100, thus forming a lower interior edges end 131 and a higher interior edges end 134. The interior edges 138 experience various spacing distances apart beginning at the lower interior edges end 131 where the spacing is the closest and increasing in the direction toward the top side 130 of the device 100, ending at the higher interior edges end 134 where the spacing between the two interior edges 138 is the greatest. At some points, the interior edges 138 may maintain a constant spacing apart for a distance, and then the spacing may be increased abruptly or gradually. At some points, the spacing between the interior edges 138 may increase on a constant substantially linear path. At points the spacing between the interior edges 138 increases abruptly, forming a shoulder or flange 132 at the point of change in spacing. Device 100 further comprises distal cord channel 145.

FIG. 4 is a left side view of the device 100 comprising a top side 130; a bottom side 140; a distal end 150; and a proximal end 160.

FIG. 5 is a top perspective view of the device 100.

FIGS. 6A-6G are depictions of various uses of the device. In FIG. 6A, device 100 is used to connect a single bungee cord to 2 surfaces. In FIG. 6B, two bungee cords connected to two surfaces are connected using the device 100. In FIG. 6C, a single bungee cord is tightened while connected to two surfaces using device 100. In FIG. 6D, two cords are connected to two surfaces and tightened using three devices 100. In FIG. 6E, two cords are connected to two surfaces and tightened using two devices 100. In FIG. 6F, a single cord is connected to a surface and tightened using the device 100. In FIG. 6G, a single cord is connected to a surface and tightened using the device 100.

The foregoing embodiments have been presented for the purpose of illustration and description only and are not to be construed as limiting the scope of the invention in any way. While the invention has been described in the context of connecting 2 ropes or cords, or tightening 1 rope or cord, the invention is not so limited but rather the scope of the invention is to be determined from the claims appended hereto.

What is claimed is:

1. A device for connecting 2 ropes or cords, comprising:
a body comprising a right lateral side and a left lateral side;
a top side;
a bottom side;
a distal end; and
a proximal end,
wherein the device further comprises a cavity defined between the left lateral side, the right lateral side, the distal end and the proximal end, wherein the cavity extends through the body from the top side to the bottom side, wherein the device comprises a distal cord retainer disposed at the distal end on the top side and a proximal cord retainer disposed at the proximal end on the top side, wherein the device comprises a distal cord channel disposed at the distal end on the bottom side and a proximal cord channel disposed at the proximal end on the bottom side, wherein each distal and proximal cord retainer comprises opposing interior edges extending upwardly toward the top side of the device and downwardly toward the bottom side of the device from substantially the mid-point between the top side of the device and the bottom side of the device, further comprising a lower interior edges end and a higher interior edges end, wherein the interior edges experience various spacing distances apart beginning at the lower interior edges end where the spacing is the closest and increasing in the direction toward the top side of the device, ending at the higher interior edges end where the spacing between the two interior edges is the greatest.

2. The device of claim 1, wherein the interior edges maintain a constant spacing apart for a portion of the distance of the interior edges.

3. The device of claim 2, wherein the spacing between the interior edges is greater at some points than at other points.

4. The device of claim 3, wherein the spacing between the interior edges increases along a constant substantially linear path.

5. The device of claim 4, wherein a shoulder is formed where the spacing between the interior edges increases abruptly.

6. The device of claim 1, wherein the device is constructed from a plastic material.

7. The device of claim 6, wherein the device is constructed from ABS.

8. The device of claim 1, wherein the device is constructed from metal.

9. The device of claim 1, wherein the device is constructed from fiberglass.

* * * * *